United States Patent [19]

Roberts et al.

[11] Patent Number: 4,548,496
[45] Date of Patent: Oct. 22, 1985

[54] NON-OBSTRUCTING LASER BEAM SAMPLING METER

[75] Inventors: Thomas G. Roberts, Huntsville; Thomas E. Honeycutt, Somerville, both of Ala.

[73] Assignee: The United States of America as represented by the Secretary of the Army, Washington, D.C.

[21] Appl. No.: 499,593

[22] Filed: May 31, 1983

[51] Int. Cl.$^4$ .............................................. G01J 1/00
[52] U.S. Cl. .................................................. 356/213
[58] Field of Search ............... 356/213, 214, 215, 216, 356/217, 218, 219, 220, 221, 222, 234, 308, 326, 432; 219/121 L, 121 LZ, 121 LM

[56] References Cited

U.S. PATENT DOCUMENTS

| | | | |
|---|---|---|---|
| 3,031,577 | 4/1962 | Garbellano | 356/213 |
| 4,094,608 | 6/1978 | Young | 356/326 |
| 4,184,127 | 1/1980 | Green et al. | 356/308 |
| 4,325,252 | 4/1982 | Miller et al. | 356/432 |
| 4,381,148 | 4/1983 | Ulrich et al. | 356/213 |

OTHER PUBLICATIONS

N. Uchitomi et al., "Analysis of Dynamical ... Cathode Surface", Optics Communication, vol. 44, No. 3, Jan. 83, pp. 154–158.

Primary Examiner—Vincent P. McGraw
Assistant Examiner—S. A. Turner
Attorney, Agent, or Firm—Anthony T. Lane; Robert P. Gibson; James T. Deaton

[57] ABSTRACT

A non-obstructing laser beam sampling meter which measures the power output of a laser by utilizing the optogalvanic effect in the electrode space of a glow discharge which is made to operate on the left side of the Paschen curve where breakdown voltage increases with decreasing pressure.

4 Claims, 2 Drawing Figures

NON-OBSTRUCTING LASER BEAM SAMPLING METER

DEDICATORY CLAUSE

The invention described herein may be manufactured, used, and licensed by or for the Government for governmental purposes without the payment to us of any royalties thereon.

BACKGROUND OF THE INVENTION

In many experiments and applications utilizing lasers, it is desired to know the output power of the laser and how this power varies with time while the experiment is being performed. This could best be accomplished by using an inline power meter which does not obstruct the beam, which does not remove from the laser beam an appreciable number of photons, and which directly reads out the power with a response time short enough to indicate fluctuations of interest. Such a device has not previously existed because low energy laser beams do not produce large enough effects and high energy laser beams tend to be too destructive. However, for high energy pulse laser beams, sampling meters have been used where part of the beam is reflected to a meter which reads the power. An example of this type of monitor is that such as disclosed by Jenkins et al., U.S. Pat. No. 4,035,088 dated Apr. 7, 1981. In this device, several reflectors or beam splitters are used. These beam splitters must be extremely uniform or each must be calibrated separately and it must be hoped that the beam splitters do not degrade in use. Therefore, it can be clearly seen that a non-obstructing laser beam sampling meter which may be used with both high power lasers and relatively low power lasers while operating in either the cw or the relatively pulse modes is needed.

Accordingly, it is an object of this invention to provide a sampling device which samples a laser beam and measures the beam power without blocking or unduly perturbing the beam.

Another object of this invention is to provide a meter which accurately and reliably samples the beam energy at full power without effecting the beam characteristics for further use of the beam.

Still another object of this invention is to provide a unique meter which allows the total laser output to pass therethrough and be measured for its power and allow the laser output to still be utilized to do the work desired.

Still another object of this invention is to provide a non-obstructing laser beam sampling meter which is used in line with the laser beam, which does not appreciably effect the beam, and which can be used with both cw and pulsed lasers.

Other objects and advantages of this invention will be obvious to those skilled in this art.

SUMMARY OF THE INVENTION

In accordance with this invention, a non-obstructing laser beam sampling meter is provided which includes a chamber which is filled with a low pressure inert gas, electrodes mounted in the chamber, laser windows aligned at opposite sides of the chamber for allowing a laser beam to be directed through the chamber, a circuit connected across the electrodes, and measuring means connected in the circuit to measure the power of the laser beam as it traverses through the chamber with the low pressure inert gas therein. This function is accomplished by use being made of the optogalvanic effect in the electrode space of a low-pressure glow discharge where the entire discharge consists of the cathode-fall region, where the dynamic resistance of the discharge is positive, where the optogalvanic effect is some 50 to 100 times stronger than in the positive column of glow discharges, and where high total currents can flow without driving the discharge unstable.

DESCRIPTION OF THE PREFERRED EMBODIMENT

Figure 1:
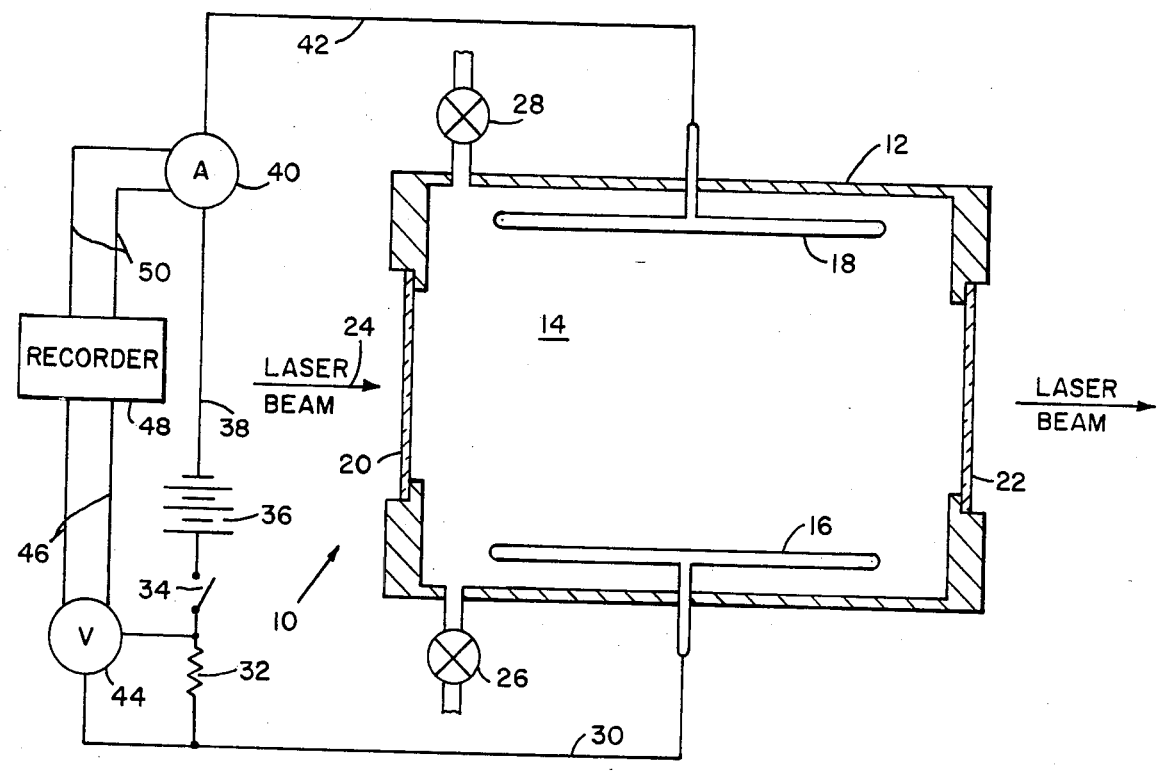
FIG. 1 is a schematic illustration of the laser beam sampling meter in accordance with this invention.

Referring now to the drawings, a laser beam sampling meter 10 consists of a cavity 12 which has a chamber 14 therein with anode 16 and cathode 18 mounted therein and spaced apart a predetermined distance. Cavity 12 has windows 20 and 22 mounted therein on opposite sides of the cavity for the passing of a laser beam 24 through windows 20 and 22 and between electrodes 16 and 18 for measuring the power of the laser beam as it passes through cavity 12. Cavity 12 has means 26 for evacuating chamber 14 and means 28 for filling chamber 14 with an inert gas. The inert gas can be such gases as neon, helium, argon, xenon, and krypton. The circuit for measuring the laser discharge includes a lead connection 30 from anode 16 to a limiting resistor 32 which is connected to on-off switch 34 and from on-off switch 34 to battery 36 and from the negative side of battery 36 through lead 38 to ammeter 40 and from ammeter 40 through lead 42 to cathode 18. A voltmeter 44 is connected in parallel with resistor 32 and voltmeter 44 has output connections 46 that are connected to a recorder 48 and ammeter 40 has leads 50 therefrom that are connected to recorder 48. Recorder 48 accordingly is used for recording the signals produced by ammeter 40 or voltmeter 44 to have a recording of the measured laser beam power.

The material used for windows 20 and 22 are of conventional material structure and the position of these windows depends on the laser being used. Windows used may have an anti-reflecting coating or they may be placed at Brewster's angle. The material of the windows obviously must be compatible with the laser beam to be measured.

Chamber 14 of cavity 12 is filled with any of the inert gases such as $He^4$, Ne, A, Xe, and Kr. The particular inert gas to be used is selected in accordance with the desired wavelength of the particular laser that is to have the power thereof measured. For Ne $\lambda = 0.594$ μm and 0.6598 μm and other wavelengths also. It is pointed out that applicants particularly desire to measure at the wavelength of 0.594 μm using the inert gas Ne. For $He^4$ the effect is strongest for $\lambda = 2.05813$ μm. The pressure of the inert gas to be used in chamber 14 is determined from $p1 \leq 1.0$ cm torr where 1 is the distance between electrodes 16 and 18 in cm and where p is in torr. For example, for $He^4$ where $1 = 10$ cm, then $p \leq 0.1$ torr. The pressure for discharges in Ne, A, Xe and Kr are determined from a similar P1 product, but for a given 1 the pressure is only slightly different. It is further noted that when intense radiation from a tunable laser is used, the optogalvanic effect due to the exitation of other He transitions (other wavelengths) are observed. See for example J. E. Lowler, Physics Revised, Vol. A 22, P 1025, 1980. It is also pointed out that the isotope $He^3$ responds to slightly different wavelengths than $He^4$. This is also true for isotopes of Ne, A, Xe, and Kr. Therefore, one must use gases of only one isotope and one must select that desired for the wavelength of the laser one wishes to monitor or measure. It is further pointed out that when the output is being measured or monitored with very powerful laser, a little ($10^{-4}$%) of argon can be added to the gases He or Ne to reduce sensivity.

When it is desired to use the meter to measure the power output of a desired laser, chamber 14 of cavity 12 is evacuated by evacuation means 26 and then filled to the desired low pressure with the desired inert working gas through filling means 28. For example, one may use the inert gas Ne. The device is then calibrated, for the wavelength of the laser with which it is to be used, by passing a beam of known power between electrodes 16 and 18 and noting the meter reading on meter 40 or meter 44. A second beam of known power but different from the first beam is passed through the device and the reading on the selected meter of meters 40 and 44 is again noted. To check linearity, the calibration is repeated at a third known power. The scale constant is now known in units of meterdivision deflections/watt and the device is ready for use. In use, laser beam sampling meter 10 is merely placed in the beam line 24 of the laser to be monitored while the laser is being utilized in an experiment or application of interest. The output of meter 10 is measured by meter 40 or 44 and the reading may be recorded and displayed in the most convenient manner. For example, recorder 48 could be any conventional recorder, oscilloscope, visual, or direct input to a controlling computer or such.

The response time of meter 10 is such that beam power fluctuations from beam source 24 on a time scale long compared with $10^{-4}$ sec will be observed. Thus, pulsed lasers with pulse widths much shorter than $10^{-4}$ sec and with interpulse spacings greater than $10^{-4}$ sec (that is, operating at a rep rate such as $10^3$ Hz or less) will have the effect of each pulse being recorded and the device will perform as a power meter for pulsed lasers. Pulsed lasers which operate at a rep rate much greater than $10^3$ Hz will appear to be a cw laser and only the average power will be obtained.

Figure 2:
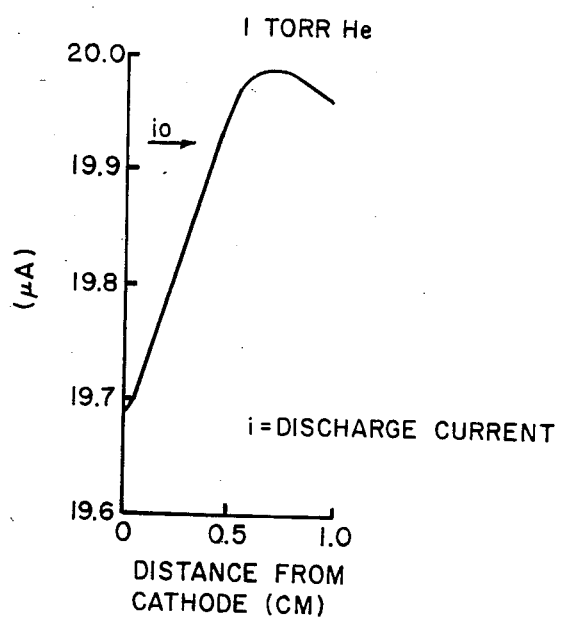
FIG. 2 is a graph illustrating optogalvanic effect for He.

FIG. 2 illustrates how the magnitude of the optogalvanic effect varies with distance across the discharge when the discharge is operated on the left side of the Paschen curve where the breakdown voltage increases with decreasing pressure. The discharge interested in by applicants occurs between plane parallel electrodes 16 and 18 at low pressure as discussed supra. When Ne is used as the working gas in the meter, and red laser light is used, the effect is 50 to 100 times larger than the same effect in the positive columns of a glow discharge. The effect is a laser-induced depletion of metastable atoms which play an important role in electron emission from cold-cathode discharges. Most of the discharge current at the cathode surface is carried by returning ions. Therefore, the cathode-fall region provides a natural gain mechanism for this effect. Also the low electron concentrations in this region minimizes competition between inelastic electron collisions and laser photons. The absolute magnitude of the steady-state optogalvanic effect is given by the ratio of the change in power delivered to load resistor 32 to the absorbed laser power. Ratios greater than 400 may be obtained and only very small parts of the laser light need be absorbed.

We claim:

1. A laser beam sampling meter comprising a cavity having a chamber therein, laser windows mounted in opposite walls of said cavity, electrodes mounted in said cavity and being positioned perpendicular to said laser windows to define an area between said electrodes through which laser light passing through said windows will pass between said electrodes, said electrodes each having plane parallel surfaces, said chamber having an inert gas of low pressure therein, and a circuit including a power supply, an on-off switch and a limiting resistor all connected in series across said electrodes and meter measuring means connected in said circuit for measuring power across said electrodes, said electrodes having their plane parallel surfaces spaced to define a optogalvonic effect in the electrode space of a low pressure glow discharge where the entire discharge consists of the cathode-fall region, where the dynamic resistance of the discharge is positive, and where high total currents can flow without driving the discharge unstable.

2. A laser beam sampling meter as set forth in claim 1, wherein said electrodes have plane parallel surfaces and said inert gas in said chamber is an inert gas selected from the group consisting of helium, neon, argon, xenon, and krypton, and said meter measuring means comprising a voltmeter connected in parallel across said limiting resistor.

3. A laser beam sampling meter as set forth in claim 1, wherein said electrodes have plane parallel surfaces and said inert gas in said chamber is an inert gas selected from the group consisting of helium, neon, argon, xenon, and krypton, and said meter measuring means comprising an ammeter connected in series in said circuit.

4. A laser beam sampling meter as set forth in claim 1, wherein said inert gas is neon and said meter measuring means includes a recorder connected to said meter measuring means for recording data of the meter measuring means.

* * * * *